United States Patent [19]

Ozu et al.

[11] Patent Number: 5,234,524
[45] Date of Patent: Aug. 10, 1993

[54] PROCESS FOR THE PREPARATION OF LAMINATE

[75] Inventors: Takahiro Ozu; Keizo Abe; Kazuhide Hayama; Kazuyuki Hata, all of Yokkaichi, Japan

[73] Assignee: Mitsubishi Petrochemical Co., Ltd., Tokyo, Japan

[21] Appl. No.: 782,324

[22] Filed: Oct. 24, 1991

[30] Foreign Application Priority Data

Oct. 25, 1990 [JP] Japan .................................. 2-288140

[51] Int. Cl.$^5$ ................................................. C09J 5/02
[52] U.S. Cl. .................................... 156/327; 156/334; 428/421; 525/242; 525/301; 525/303
[58] Field of Search ................ 156/327, 334; 428/421; 525/242, 303, 301

[56] References Cited

U.S. PATENT DOCUMENTS 3,390,206  6/1968  Thompson et al. .................. 525/303
4,588,642  5/1986  Ochiumi .
4,677,017  6/1987  De Antonis et al. ............... 428/421
4,741,970  5/1988  Fairchok et al. .

FOREIGN PATENT DOCUMENTS 0308146   3/1989  European Pat. Off. .
0460393  12/1991  European Pat. Off. .

*Primary Examiner*—John J. Gallagher
*Attorney, Agent, or Firm*—Wegner, Cantor, Mueller & Player

[57] ABSTRACT

There is provided a process for preparing a laminate, comprising the step of adhering a layer of an olefin polymer and a layer of a fluororesin to each other by fusion with the aid of an adhesive polymer, the adhesive polymer being a polymerization product A prepared by copolymerizing a radical-polymerizable olefin polymer B, which is obtained by reacting an olefin polymer (a) having at least one functional group in one molecule thereof with a radical-polymerizable monomer (b) having a functional group which can react with the functional group contained in the olefin polymer (a), with a monomer (c) which comprises as essential components alkyl acrylate, alkyl methacrylate and/or a fluorine-containing unsaturated monomer and is copolymerizable with the radical-polymerizable olefin polymer B, the polymerization product A comprising from 10 to 90 wt. % of the monomer (c).

9 Claims, No Drawings

PROCESS FOR THE PREPARATION OF LAMINATE

BACKGROUND OF THE INVENTION

1. Field of the Invention

This invention relates to a process for preparing a laminate, in which an olefin polymer layer and a fluororesin layer are adhered to each other by fusion with the aid of an adhesive polymer.

2. Background Art

Fluororesins are excellent in resistances to chemicals, solvents and weather, and are free from stickiness. They are therefore utilized for various purposes.

However, since the nonstickiness of fluororesins brings about low adhesion between fluororesin layers and substrates of various materials, the fluororesin layers easily come off the substrates.

To improve the adhesive property of fluororesins, for instance, to enhance the adhesion between fluororesins and metallic substrates, the following methods have been devised:

a method disclosed in Japanese Laid-Open Patent Publication No. 1-149880, in which a composition comprising an epoxyacrylate resin, a vinylidene fluoride resin and a methacrylic resin is employed as a primer; and a method disclosed in Japanese Laid-Open Patent Publication No. 1-146965, in which a composition comprising as essential components a polyol resin, a polyisocyanate compound and a thermoplastic acrylic resin is utilized as a primer.

However, a simple and satisfactory technique of adhering a layer of a fluororesin to a layer of an olefin resin such as polyethylene or polypropylene has not been known as yet.

SUMMARY OF THE INVENTION

The inventors of the present invention have succeeded in preparing a laminate of an olefin polymer layer and a fluororesin layer, in which these two layers are firmly adhered to each other by fusion with the aid of a newly developed primer effectively usable for fluororesins.

Thus, the present invention provides a process for preparing a laminate, comprising the step of adhering a layer of an olefin polymer and a layer of a fluororesin to each other by fusion with the aid of an adhesive polymer, the adhesive polymer being a polymerization product A prepared by copolymerizing a radical-polymerizable olefin polymer B, which is obtained by reacting an olefin polymer (a) having at least one functional group in one molecule thereof with a radical-polymerizable monomer (b) having a functional group which can react with the functional group contained in the olefin polymer (a), with a monomer (c) which comprises as essential components alkyl acrylate, alkyl methacrylate and/or a fluorine-containing unsaturated monomer and is copolymerizable with the radical-polymerizable olefin polymer B, the polymerization product A comprising from 10 to 90 wt. % of the monomer (c).

According to the present invention, an olefin polymer and a fluororesin can be firmly adhered to each other by using the specific polymer as an adhesive. Therefore, a laminate having both of the advantageous properties of fluororesins and those of olefin polymers can be obtained with ease and at low cost.

DETAILED DESCRIPTION OF THE INVENTION

Olefin Polymer

Examples of the olefin polymer usable in the present invention include homopolymers and copolymers of α-olefins such as ethylene, propylene and butene-1; and block, random and graft copolymers of the α-olefins and other unsaturated monomers containing the α-olefins as the main components. Examples of the unsaturated monomers may include vinyl esters such as vinyl acetate, unsaturated carboxylic acids such as acrylic acid and maleic anhydride, esters of unsaturated carboxylic acid such as ethyl acrylate and methyl methacrylate, aromatic vinyl monomers such as styrene, vinylsilanes such as vinyltrimethoxy silane and γ-methacryloyl oxypropylmethoxysilane.

Inorganic fillers, coloring agents, various stabilizing agents, electroconductivity-imparting agents and the like may be compounded with the olefin polymer unless the moldability of the polymer is impaired.

Even those olefin polymers which have no polarity may be favorably used in the present invention, and these polymers can be selected from commercially available ones. In particular, polyethylene and polypropylene are preferable from the viewpoint of moldability..

Fluororesin

Examples of the fluororesin usable in the present invention include homopolymers and copolymers of vinyl fluoride, vinylidene fluoride, chlorotrifluoroethylene, tetrafluoroethylene, hexafluoropropylene and perfluoroalkyl vinyl ether, and copolymers of these fluorine-containing monomers and e-olefins such as ethylene, and propylene.

Of the above fluororesins, polyvinyl fluoride and polyvinylidene fluoride are preferred, and polyvinylidene fluoride is most preferred from the viewpoints of moldability and adhesion by fusion. In the present invention, a composition which is a blend of polyvinylidene fluoride and polymethyl methacrylate can also be used as the fluororesin. Moreover, inorganic fillers, coloring agents and various stabilizing agents may be incorporated into the fluororesin unless the moldability of the resin is impaired.

Adhesive Polymer

The polymerization product A, which is used as the adhesive polymer in the present invention, can be obtained by the copolymerization of a radical-polymerizable olefin polymer B and a monomer (c). The radical-polymerizable olefin polymer B can be obtained by reacting an olefin polymer (a) having at least one functional group in one molecule thereof with a radical-polymerizable monomer (b) having a functional group which can react with the functional group contained in the olefin polymer (a). The monomer (c) is a monomer which comprises as essential components at least one of alkyl acrylate, alkyl methacrylate and/or a fluorine-containing unsaturated monomer and is copolymerizable with the radical-polymerizable olefin polymer B.

Olefin Polymer (a):

The weight-average molecular weight of the olefin polymer (a) having at least one functional group in one molecule thereof, which is used as a starting material for the production of polymerization product A, is preferably from 1,000 to 200,000, more preferably from 10,000 to 100,000. When the olefin polymer (a) having an extremely low molecular weight is used, the resulting adhesive polymer cannot exhibit sufficiently high adhesion. In the case where the molecular weight is too high, gelation tends to easily occur when copolymerizing the radical-polymerizable olefin polymer B and the monomer, (c).

The olefin polymer (a) having at least one functional group in one molecule thereof can be obtained by reacting a polyolefin with an unsaturated compound having a desired functional group.

Examples of the precursor polyolefin include homopolymers and copolymers of α-olefins, such as polyethylene, polypropylene, poly(butene-1), an ethylene-propylene copolymer and an ethylene-butene copolymer; copolymers of an α-olefin and a conjugated diene, such as an ethylene-propylene-diene copolymer and an isobutene-isoprene copolymer; polymers of conjugated dienes such as polybutadiene and polyisoprene; copolymers of an aromatic vinyl compound and a conjugated diene, such as a styrene-butadiene copolymer, a styrene-butadiene-styrene block copolymer and a hydrogenated compound thereof, a styrene-isoprene copolymer, and a styrene-isoprene-styrene block copolymer and a hydrogenated compound thereof; and chlorinated compounds of the above polyolefins.

Various compounds can be mentioned as the unsaturated compound which is reacted with the above precursor polyolefin to give the olefin polymer (a), depending upon a functional group to be introduced into the polyolefin.

Thus, in order to introduce a carboxyl group or carboxylic anhydride group into the precursor polyolefin, unsaturated carboxylic acids or anhydrides thereof, for instance, (meth)acrylic acid, fumaric acid, maleic acid and its anhydride, itaconic acid and its anhydride, crotonic acid and its anhydride, and citraconic acid and its anhydride are usable.

The term "(meth)acrylic acid" herein refers to both acrylic acid and methacrylic acid.

An epoxy group can be introduced into the polyolefin by using any of the following compounds:

Glycidyl esters of unsaturated carboxylic acids such as glycidyl (meth)acrylate, mono- and diglycidyl esters of maleic acid, mono- and diglycidyl esters of itaconic acid, and mono- and diglycidyl esters of allylsuccinic acid; glycidyl ester of p-styrene carboxylic acid; glycidyl ethers such as allyl glycidyl ether, 2-methylallyl glycidyl ether and styrene-p-glycidyl ether; p-glycidyl styrene; epoxy olefins such as 3,4-epoxy 1-butene and 3,4 epoxy-3-methyl-1-butene; vinylcyclohexene monooxide; and the like.

A hydroxyl group can be introduced into the polyolefin by using any of the following compounds:

Hydroxyalkyl (meth)acrylates such as 2-hydroxyethyl (meth)acrylate, 2-hydroxypropyl (meth)acrylate and 2-hydroxybutyl (meth)acrylate; alkenyl alcohols such as N-methylol (meth)acrylamide, an addition polymerization product of 2-hydroxyethylacrylate-6-hexanolide and 2-propene-1-ol; alkynyl alcohols such as 2-propyne-1-ol; hydroxyvinyl ethers; and the like.

An isocyanate group can be introduced into the polyolefin by using 2-isocyanate ethyl (meth)acrylate or methacryloy isocyanate.

The reaction of the polyolefin and the unsaturated compound having a functional group can be carried out in the conventional manner by using a radical initiator. Among the above-enumerated polyolefins, poly(α-olefins) such as polyethylene and polypropylene, styrene elastomers such as a styrene-butadiene-styrene block copolymer and a hydrogenated compound thereof, and modified compounds of chlorinated polyolefin are most preferable in the present invention.

Radical-polymerizable Monomer (b)

The radical-polymerizable olefin polymer B, which is used for the preparation of the polymerization product A, can be obtained by reacting the above olefin polymer (a) with a radical-polymerizable monomer (b) having a functional group which can react with the functional group contained in the olefin polymer (a).

Examples of the functional group which can react with the carboxyl group or carboxylic anhydride group contained in the olefin polymer (a) include a hydroxyl group, an epoxy group and an isocyanate group.

Examples of the radical-polymerizable monomer (b) having a hydroxyl group include hydroxyalkyl (meth)acrylates such as 2-hydroxyethyl (meth)acrylate, 2-hydroxypropyl (meth)acrylate and 2-hydroxybutyl (meth)acrylate; alkenyl alcohols such as N-methylol (meth)acrylamide, an addition polymerization product of 2-hydroxyethylacrylate-6-hexanolide and 2-propene-1-ol; alkynyl alcohols such as 2-propyne-1-ol; and hydroxyvinyl ethers.

Examples of the radical-polymerizable monomer (b) having an epoxy group include glycidyl esters of unsaturated carboxylic acids such as glycidyl (meth)acrylate, mono- and diglycidyl esters of maleic acid, mono- and diglycidyl esters of itaconic acid, and mono- and diglycidyl esters of allylsuccinic acid; glycidyl ester of p-styrene carboxylic acid; glycidyl ethers such as allyl glycidyl ether, 2-methylallyl glycidyl ether and styrene-p-glycidyl ether; p-glycidyl styrene; epoxy olefins such as 3,4-epoxy-1-butene and 3,4-epoxy-3-methyl-1-butene; and vinylcyclohexene monooxides.

Examples of the radical-polymerizable monomer (b) having an isocyanate group include 2-isocyanate ethyl(meth)acrylate and methacryloyl isocyanate.

Of the above-enumerated radical-polymerizable monomers, those having a hydroxyl group are most preferred.

Functional groups which can react with the epoxy group contained in the olefin polymer (a) include a carboxyl group and a hydroxyl group.

Examples of the radical-polymerizable monomer (b) having a carboxyl group include unsaturated acids such as (meth)acrylic acid, and carboxyalkyl vinyl ethers such as carboxyethyl vinyl ether and carboxypropyl vinyl ether.

Examples of the radical-polymerizable monomer (b) having a hydroxyl group include those monomers which have been previously mentioned as examples of the radical-polymerizable monomer (b) which can react with the carboxyl group or carboxylic anhydride group contained in the olefin polymer (a).

Of these monomers, the radical-polymerizable monomers having a carboxyl group are most preferred.

Functional groups which can react with the hydroxyl group contained in the olefin polymer (a) include an isocyanate group, a carboxyl group and an epoxy group.

Examples of the radical-polymerizable monomer (b) having an isocyanate group, and the one having an epoxy group include those monomers which have been previously mentioned as examples of the radical-polymerizable monomer (b) which can react with the carboxyl group or carboxylic anhydride group contained in the olefin polymer (a); and examples of the radical polymerizable monomer (b) having a carboxyl group include those monomers which have been enumerated as examples of the radical-polymerizable monomer (b) which can react with the epoxy group contained in the olefin polymer (a).

Of these monomers, the radical-polymerizable monomers having an isocyanate group are most preferred.

Functional groups which can react with the isocyanate group contained in the olefin polymer (a) include a hydroxyl group and a carboxyl group.

Examples of the radical-polymerizable monomer (b) having a hydroxyl group, and the one having a carboxyl group are respectively the same monomers as those mentioned previously. Of these monomers, the radical-polymerizable monomers having a hydroxyl group are most preferred.

Radical-polymerizable Olefin Polymer B

To obtain the radical-polymerizable olefin polymer B, it is preferable that the olefin polymer (a) and the radical-polymerizable monomer (b) be reacted in such a manner that the amount of the functional group contained in the monomer (b) is from 0.1 to 10 equivalents for 1 equivalent of the functional group contained in the olefin polymer (a). When the amount of the functional group contained in the monomer (b) is less than 0.1 equivalent, the content of homopolymer of monomer (c) in the final polymerization product A becomes too large. On the other hand, when the amount of the functional group in the monomer (b) is more than 10 equivalents, gelation tends to occur during the copolymerization between the olefin polymer B and the monomer (c).

The reaction temperature is from 20° to 150° C., preferably from 50° to 120° C.

In the case where the reaction involves esterification, an acid or a basic compound, such as sulfuric acid, paratoluenesulfonic acid, zinc chloride, pyridine, triethylamine or dimethylbenzylamine may be used as a catalyst to accelerate the reaction. When the reaction involves the formation of urethane, tin dibutyldilaurate may be employed as a catalyst.

In order to prevent the formation of a homopolymer of a vinyl monomer, it is preferred to carry out the reaction in an oxygen or air ambient, and to add a suitable amount of a polymerization inhibitor such as hydroquinone, hydroquinone monomethyl ether or phenothiazine to the reaction system.

It is also preferred that the reaction be carried out in a proper organic solvent such as toluene, xylene, methyl ethyl ketone, methyl isobutyl ketone, butyl acetate, or cellosolve acetate.

Monomer (c)

The monomer (c), which is copolymerizable with the radical-polymerizable olefin polymer B and is used for the preparation of the polymerization product A, is a monomer comprising as essential components alkyl acrylate, alkyl methacrylate and/or a fluorine-containing unsaturated monomer.

Examples of the alkyl (meth)acrylate include methyl (meth)acrylate, ethyl (meth)acrylate, butyl (meth)acrylate and 2-ethylhexyl (meth)acrylate. Of these, methyl (meth)acrylate is most preferred.

Examples of the fluorine-containing unsaturated monomer include fluoroalkyl (meth)acrylates such as trifluoroethyl (meth)acrylate, tetrafluoropropyl (meth)acrylate, hexafluorobutyl (meth)acrylate, octafluoropentyl (meth)acrylate, heptadecafluorononyl (meth)acrylate and heptadecafluorodecyl (meth)acrylate, and fluorine-containing olefins such as tetrafluoroethylene, trifluoroethylene, vinylidene fluoride, vinyl fluoride, monochlorotrifluoroethylene, 1-chloro-2,2-difluoroethylene, 1,1-dichloro-2,2-difluoroethylene, vinylidene chloride, hexafluoropropene, 3,3,3,2-tetrafluoropropene, trifluoromethylethylene, 2-fluoropropene, 2-chloro-1,1,3,3,3-pentafluoropropene, 1,1,2-trichloro-3-trifluoropropane, perfluoro-1-butene, perfluoro-1-pentene, perfluorobutylethylene, perfluoro-1-heptene, perfluoro-1-nonene, 8-H-perfluoro-1-octene, perfluorohexylethylene, perfluorooctylethylene, perfluorodecylethylene, and perfluorododecylethylene. Of these, fluoroalkyl (meth)acrylates are most preferred.

Examples of other monomers copolymerizable with the radical-polymerizable olefin polymer B include α- or β-unsaturated carboxylic acids such as (meth)acrylic acid and monoalkyl maleate; hydroxyalkyl (meth]acrylates such as 2-hydroxyethyl (meth)acrylate, 2-hydroxypropyl (meth)acrylate and 2-hydroxybutyl (meth)acrylate; polymerizable monomers having an oxylane group such as glycidyl (meth)acrylate; unsaturated amides such as (meth)acrylamide; (meth)acrylonitrile; epoxyacrylates; (meth)acrylates additioned with alkylene oxide; (meth)acrylates of polyhydric alcohols such as ethylene glycol di(meth)acrylate and propylene glycol (meth)acrylate; urethane-modified polyhydric acrylates having a (meth)acryloyl group in one molecule thereof; vinyl ethers such as vinyl acetate, vinyl chloride, ethyl vinyl ether, butyl vinyl ether and hexyvinyl ether, aromatic compounds having a vinyl group such as vinyl toluene, styrene and α-methylstyrene; and olefins such as ethylene, propylene, butene and isoprene The amount of the acrylate, methacrylate and/or the fluorine-containing unsaturated monomer, which is the essential component of the monomer (c), is 30 wt. % or more, preferably 50 wt. % or more, of the weight of the monomer (c). When the amount of the essential component(s) is less than 30 wt. %, the fluororesin layer cannot be adhered to the olefin polymer layer with sufficiently high adhesive strength.

Polymerization Product A

The polymerization product A is prepared by copolymerizing the above-described radical-polymerizable olefin polymer B and the monomer (c).

The copolymerization reaction between the polymer B and the monomer (c) may be carried out by using, as a reaction solvent, an organic solvent such as toluene, xylene, methyl ethyl ketone, methyl isobutyl ketone, butyl acetate, cellosolve acetate, ethanol, butanol or propanol. A peroxide such as benzoyl peroxide, di-tert-butyl peroxide or cumene hydroperoxide, or an azobis compound such as azobisisobutylonitrile is employed as a polymerization catalyst. The amount of the catalyst is from 0.1 to 10 wt. %, preferably from 1 to 5 wt. %, of the weight of the monomer (c). The reaction is carried out for 1 to 20 hours while heating the reaction system to a temperature of 50° to 200° C. It is preferable to employ the reaction solvent in such an amount that the total amount of the copolymerizing components, the polymer B and the monomer (c), can be from 5 to 50 wt. % of the total weight of the reaction system. The reaction is preferably conducted in an atmosphere of or under a 5 stream of an inert gas such as nitrogen. In order to minimize the amount of the residual monomer, the azobis compound and the peroxide may be used together as polymerization initiators.

The polymerization product A which is obtainable after separation and washing contains from 10 to 90 wt. %, preferably from 30 to 70 wt. %, of the monomer (c).

When the content of the monomer (c) is outside the above range, the adhesive polymer cannot exhibit sufficiently high adhesion.

The above-obtained polymerization product A may be diluted with an olefin polymer, an acrylic polymer or a fluororesin to provide the adhesive polymer for use in the present invention.

Laminate

The above-obtained adhesive polymer, that is, the polymerization product A or a polymer prepared by diluting the polymerization product A with an olefin polymer, an acrylic polymer or a fluororesin, is placed between a layer of the olefin polymer and a layer of the fluororesin and heated so that these two layers can be adhered to each other by fusion. A laminate in which the olefin polymer layer and the fluororesin layer are firmly adhered to each other can thus be successfully obtained.

The thickness of the olefin polymer layer is from 0.05 to 5 mm, preferably from 0.5 to 3 mm, that of the fluororesin layer is from 0.01 to 2 mm, preferably from 0.05 to 1 mm, and that of the adhesive layer is from 0.001 to 2 mm, preferably from 0.01 to 1 mm.

Besides the above three layers, the laminate can comprise other layers of other materials.

The laminate can be prepared by any one of known methods such as a co-extrusion method, a rotational molding method, a fluidized bed coating method and an electrostatic coating method.

The present invention will now be explained more specifically with reference to the following Examples, which are given for illustrating of this invention and are not intended to be limiting thereof.

EXAMPLE 1

Preparation of Adhesive Polymer

In a glass flask equipped with a stirrer, a reflux condenser, a dropping funnel and a thermometer were placed 100 g of a hydrogenated styrene-butadiene-styrene block copolymer ("Kraton G-1652" (Trademark) manufactured by Shell Chemical Corp.) and 1,000 g of xylene. The system was then purged with nitrogen gas, and was heated to a temperature of 125° C. A solution prepared by dissolving 4.0 g of maleic anhydride and 0.6 g of dicumylperoxide in 80 g of xylene was added dropwise to the reaction system over six hours, and reaction was continued at 125° C. for an additional one hour. After the reaction was completed, the reaction system was cooled to near room temperature. 3000 g of acetone was then added to the system to reprecipitate a maleic hydrogenated styrene-butadiene-styrene block copolymer, followed by filtration and drying, thereby obtaining an olefin polymer (a).

The amount of maleic anhydride contained in the olefin copolymer (a) was 1.5 wt. %, which was determined by infrared absorption spectroscopy and neutralization titration.

20 g of the above-obtained olefin polymer (a) and 150 g of toluene were placed in a glass flask equipped with a stirrer, a reflux condenser, a dropping funnel and a thermometer, and the system was heated to a temperature of 70° C. under a stream of air to dissolve the polymer. To the resulting solution was added a solution of 0.36 g of 2-hydroxyethyl acrylate as a radical-polymerizable monomer (b), 1 g of dimethylbenzylamine and 0.06 g of hydroquinone monomethyl ether in 30 g of toluene to carry out reaction at the same temperature for 5 hours, whereby a radical-polymerizable olefin polymer B was obtained.

Subsequently, the reaction system was heated to a temperature of 80° C. under a stream of nitrogen gas, and a solution prepared by dissolving 18 g of methyl methacrylate as a monomer (c) , 2 g of heptadecafluorononyl methacrylate and 0.2 g of azobisisobutylonitrile in 80 g of toluene was added dropwise to the system over a period of four hours. 0.2 g of azobisisobutylonitrile was further added to the reaction system to carry out reaction for 6 hours. 0.2 g of azobisisobutyronitrile was then added to the system again, and reaction was carried out for 5 hours. The resulting reaction mixture was poured into a poor solvent which consists of 100 parts by weight of methanol and 20 parts by weight of water and the quantity of which is three times that of the reaction mixture, thereby precipitating the polymer, followed by separation and drying to obtain a polymerization product A.

The above-obtained polymerization product A, an adhesive polymer, is an SEBS-acrylic composite polymer consisting of:

| | |
|---|---|
| SEBS (hydrogenated styrene-butadiene-styrene block copolymer modified with maleic anhydride and 2-hydroxyethylacrylate) | 50 parts by weight |
| MMA (methyl methacrylate) | 45 parts by weight |
| Acrylic fluoride (heptadecafluorononyl methacrylate) | 5 parts by weight |

Preparation of Laminate

A laminate consisting of three layers, a layer of a fluororesin (polyvinylidene fluoride (PVDF) resin, "KYNAR 710" (Trademark) manufactured by Atochem North America Corp.)/a layer of the above-obtained adhesive polymer/a layer of a polyolefin resin (polypropylene, "Mitsubishi Polypro FY-6C" (Trademark) manufactured by Mitsubishi Petrochemical Co., Ltd.), was prepared by co-extrusion using three extruders.

The thickness of the fluororesin layer was 0.3 mm, that of the adhesive polymer layer was 0.2 mm, and that of the polyolefin resin layer was 2.0 mm.

The adhesive strength of the three-layer laminate sheet was measured by using an Instron tensile tester. The measurement was carried out by using a strip of the laminate with a width of 20 mm as a test piece under the condition of a tensile speed of 50 mm/min. As a result, the adhesive strength of the laminate was determined to be higher than 8.0 kg/20 mm width, at which strength the test piece was broken.

EXAMPLE 2

A low-density polyethylene powder ("Mitsubishi Polyethy R90K" (Trademark) manufactured by Mitsubishi Petrochemical Co., Ltd.) was introduced into a 5-liter bottle-shaped rotational mold placed in a rotational molding machine, and rotational molding was conducted while maintaining the temperature inside the molding machine at 350° C.

Subsequently, the same adhesive polymer powder as obtained in Example 1 was introduced into the mold, fused and laminated onto the polyethylene layer by rotational molding.

Powder of polyvinylidene fluorine (PVDF) resin ("KYNAR 710") was then placed in the mold, fused and laminated on the adhesive polymer layer by rotational molding.

Thereafter, the rotational mold was cooled by using a fan for industrial use for 10 minutes, and then in water for additional 10 minutes. The mold was then opened, and a container of the three layer laminate was taken out therefrom.

A strip with a width of 20 mm and a length of 100 mm was cut from the above-obtained container, and the adhesive strength of the laminate was measured using the strip as a test piece in the same manner as in Example 1. The thickness of the vinylidene fluoride resin layer was 2.0 mm, that of the adhesive polymer layer was 1.0 mm, and that of the polyethylene layer was 3.0 mm. The adhesive strength was determined to be higher than 10.0 kg/20 mm width, at which strength the test piece was broken.

EXAMPLES 3 TO 9 & COMPARATIVE EXAMPLES 1 AND 2

A radical-polymerizable olefin polymer B was prepared in the same manner as in Example 1.

Subsequently, the reaction system was heated to a temperature of 80° C. under a stream of nitrogen gas, to which were added 20 g of a monomer (c) having the composition shown in Table 1, 0.12 g of azobisisobutylonitrile and 80 g of toluene to carry out reaction for 2 hours. Thereafter, 0.12 g of azobisisobutylonitrile was further added to the reaction mixture, and reaction was carried out for two hours. This procedure, the addition of azobisisobutylonitrile and the subsequent reaction, was repeated four times, and then the reaction was continued for an additional 2 hours.

The resulting reaction mixture was poured into a mixed solvent of 900 g of methanol and 180 g of water to precipitate a polymer, followed by separation and drying, thereby obtaining a polymerization product A.

The thus obtained polymerization product A, an adhesive polymer, is an SEBS-acrylic composite polymer consisting of SEBS modified with maleic anhydride and 2-hydroxyethyl acrylate, and the monomer (c) with a weight ratio of 1:1.

A laminate consisting of three layers, a layer of PVDF, "KYNAR 720" (Trademark)/a layer of the above-obtained adhesive polymer/a layer of polypropylene, "Mitsubishi Polypro FY-6C" (Trademark), was prepared by co-extrusion using three extruders.

The thickness of the PVDF layer was 0.3 mm, that of the adhesive polymer layer was 0.2 mm, and that of the polypropylene layer was 2.0 mm.

The adhesive strength of the three-layer laminate sheet was measured in the same manner as in Example 1. The results are shown in Table 1.

TABLE 1

| Example No. | Composition of Monomer (c) (wt. %) | | Adhesive Strength (kg/20 mm width) |
|---|---|---|---|
| Ex. 3 | MMA | (100) | 3.6 |
| Ex. 4 | Methyl acrylate | (100) | 3.0 |
| Ex. 5 | MMA | (95) | 6.0 |
| | HDFNMA | (5) | |
| Ex. 6 | MMA | (90) | 8.0 |
| | HDFNMA | (10) | |
| Ex. 7 | MMA | (80) | 5.5 |
| | HDFNMA | (20) | |
| Ex. 8 | MMA | (70) | 2.6 |
| | HDFNMA | (30) | |
| Ex. 9 | MMA | (85) | 8.0 |
| | HDFNMA | (10) | |
| | Ethyl methacrylate | (5) | |
| Comp. Ex. 1 | Acrylic acid | (100) | 0.1 |
| Comp. Ex. 2 | 2-hydroxyethyl acrylate | (100) | 0.2 |

(Note) HDFNMA: Heptadecafluorononyl methacrylate

EXAMPLE 10

A container made of a laminate was prepared in the same manner as in Example 2, except for using the adhesive polymer obtained in Example 3 instead of the adhesive polymer obtained in Example 1. The container thus obtained was evaluated in the same manner as in Example 2. As a result, the adhesive strength of the laminate was found to be 3.4 kg/20 mm width. It is noted that the thickness of each layer of the test piece was the same as that of the test piece used in Example 2.

EXAMPLES 11 TO 16

A radical-polymerizable olefin polymer was prepared in the same manner as in Example 1.

Subsequently, the reaction system was heated to a temperature of 80° C. under a stream of nitrogen gas, to which were added 153 g of methyl methacrylate, 18 g of heptadecafluorononyl methacrylate, 9 g of ethyl methacrylate, 1.2 g of azobisisobutylonitrile and 1120 g of toluene, and reaction was carried out for 2 hours. Thereafter, 1.2 g of azobisisobutylonitrile was further added to the reaction mixture, and reaction was carried out for two hours. This procedure, the addition of azobisisobutylonitrile and the subsequent reaction, was repeated four times, and then the reaction was continued for an additional 2 hours.

The resulting reaction mixture was poured into a mixed solvent of 4500 g of methanol and 900 g of water to precipitate a polymer, followed by separation and drying, thereby obtaining a polymerization product A.

The above-obtained polymerization product A, an adhesive polymer, is an SEBS-acrylic composite polymer consisting of:

| | |
|---|---|
| SEBS modified with maleic anhydride and 2-hydroxyethyl acrylate | 10 parts by weight |
| Methyl methacrylate | 77 parts by weight |
| Heptadecafluorononyl methacrylate | 8.5 parts by weight |
| Ethyl methacrylate | 4.5 parts by weight |

The polymerization product A and polypropylene, "Mitsubishi Polypro FY-6C" (Trademark), were kneaded in the blending ratio shown in Table 2 by a twin-screw pelletizer manufactured by Nihon Seikosho K.K., thereby preparing pellets.

A three-layer sheet was prepared in the same manner as in Example 3, using the pellets as the adhesive polymer, and the adhesive strength of the sheet was measured. The results are shown in Table 2.

TABLE 2

| Example No. | Ratio of Polymerization Product A: Polypropylene | Adhesive Strength (kg/20 mm width) |
|---|---|---|
| Ex. 11 | 3:7 | 4.0 |
| Ex. 12 | 4:6 | 5.0 |
| Ex. 13 | 5:5 | 6.2 |
| Ex. 14 | 6:4 | >8.0* |
| Ex. 15 | 7:3 | >8.0* |
| Ex. 16 | 8:2 | >8.0* |

(Note) *Fracture of the test piece

EXAMPLE 17

In the same glass flask as used in Example 1 were placed 100 g of polypropylene ("Mitsubishi Polypro MA-2P" (Trademark) manufactured by Mitsubishi Petrochemical Co., Ltd.) and 1000 g of chlorobenzene. The system was then purged with nitrogen gas, and was heated to a temperature of 130° C. A solution prepared by dissolving 20 g of maleic anhydride and 1 g of dicumylperoxide in 80 g of chlorobenzene was added dropwise to the mixture over 6 hours, and reaction was continued at the same temperature for an additional one hour. The reaction mixture was poured into 3000 g of acetone to precipitate polypropylene modified with maleic anhydride, followed by filtration and drying, thereby obtaining an olefin polymer (a).

The amount of maleic anhydride contained in the olefin polymer (a) was 8.0 wt. %.

19 g of the above-obtained olefin polymer (a), 180 g of xylene, 1.92 g of 2-hydroxyethyl acrylate, 1 g of dimethylbenzylamine and 0.06 of hydroquinone monomethyl ether were placed in a glass flask equipped with a stirrer, a reflux condenser, a dropping funnel and a thermometer, and reaction was carried out at a temperature of 120° C. for 5 hours under a stream of air, whereby a radical-polymerizable olefin polymer B was obtained.

Subsequently, 20 g of methyl methacrylate, 0.12 g of azobisisobutylonitrile and 80 g of xylene were added to the reaction mixture under a stream of nitrogen gas to carry out reaction for 2 hours. 0.12 g of azobisisobutylonitrile was then further added to the reaction mixture, and reaction was carried out for 2 hours. This procedure, the addition of azobisisobutylonitrile and the subsequent reaction, was repeated four times, and then the reaction was continued for an additional 2 hours.

The resulting reaction mixture was poured into a mixed solvent of 900 g of methanol and 180 g of water to precipitate a polymer, followed by separation and drying, thereby obtaining a polymerization product A.

The above-obtained polymerization product A, an adhesive polymer, is a polymer consisting of polypropylene modified with maleic anhydride and 2-hydroxyethyl acrylate, and methyl methacrylate with a weight ratio of 1:1.

A sheet consisting of three layers, a layer of PVDF, "KYNAR 720" (Trademark)/a layer of the above-obtained adhesive polymer/a layer of polypropylene, "Mitsubishi Polypro FY-6C" (Trademark), was prepared in the same manner as in Example 1.

The thickness of the PVDF layer was 0.3 mm, that of the adhesive polymer layer was 0.2 mm, and that of the polypropylene layer was 2.0 mm. The adhesive strength of the sheet was 3.8 kg/20 mm width.

EXAMPLE 18

A container made of a laminate was prepared in the same manner as in Example 2, except for using the adhesive polymer obtained in Example 17 instead of the adhesive polymer obtained in Example 1. The container thus obtained was evaluated in the same manner as in Example 2. As a result, the adhesive strength of the laminate was found to be 3.5 kg/20 mm width. It is noted that the thickness of each layer of the test piece was the same as that of the test piece used in Example 2.

EXAMPLES 19 TO 24 & COMPARATIVE EXAMPLES 3 AND 4

The procedure of Example 17 was repeated except that 20 g of the methyl methacrylate employed in Example 17 as the monomer (c) was replaced by 20 g of a monomer (c) as shown in Table 3, whereby an adhesive polymer was obtained.

By using the above-obtained adhesive polymer, a laminate was prepared and evaluated in the same manner as in Example 17. The results are shown in Table 3.

TABLE 3

| Example No. | Composition of Monomer (c) (wt. %) | | Adhesive Strength (kg/20 mm width) |
|---|---|---|---|
| Ex. 19 | Methyl acrylate | (100) | 3.2 |
| Ex. 20 | MMA | (95) | 5.7 |
| | HDFNMA | (5) | |
| Ex. 21 | MMA | (90) | 8.0 |
| | HDFNMA | (10) | |
| Ex. 22 | MMA | (80) | 5.2 |
| | HDFNMA | (20) | |
| Ex. 23 | MMA | (70) | 2.1 |
| | HDFNMA | (30) | |
| Ex. 24 | MMA | (85) | 7.8 |
| | HDFNMA | (10) | |
| | Ethyl methacrylate | (5) | |
| Comp. Ex. 3 | Acrylic acid | (100) | 0.1 |
| Comp. Ex. 4 | 2-hydroxyethyl acrylate | (100) | 0.2 |

(Note) HDFNMA: Heptadecafluorononyl methacrylate

What is claimed is:

1. A process for preparing a laminate, comprising the step of adhering a layer of an olefin polymer and a layer of a fluororesin to each other by fusion with the aid of an adhesive polymer,
    the adhesive polymer being a polymerization product A prepared by copolymerizing a radical-polymerizable olefin polymer (a) having at least one functional group in one molecule thereof with a radical-polymerizable monomer (b) having a functional group which can react with the functional group contained in the olefin polymer (a), with a monomer (c) which comprises as essential components at least one of alkyl acrylate, alkyl methacrylate and/or a fluorine-containing unsaturated monomer and is copolymerizable with the radical-polymerizable olefin polymer B,
    the polymerization product A comprising from 10 to 90 wt. % of the monomer (c).

2. The process according to claim 1, wherein the olefin polymer is polyethylene or polypropylene and the fluororesin is polyvinylidene fluoride.

3. The process according to claim 1, wherein the olefin polymer (a) is selected from polyethylene, polypropylene, a styrene-butadiene-styrene block copolymer, a hydrogenated compound thereof and a modified compound of chlorinated polyolefin.

4. The process according to claim 1, wherein the functional group contained in the olefin polymer (a) is a carboxyl group or carboxylic anhydride group and the functional group contained in the radical-polymerizable monomer (b) is a hydroxyl group.

5. The process according to claim 1, wherein the functional group contained in the olefin polymer (a) is an epoxy group and the functional group contained in the radical-polymerizable monomer (b) is a carboxyl group.

6. The process according to claim 1, wherein the functional group contained in the olefin polymer (a) is a hydroxyl group and the functional group contained in the radical-polymerizable monomer (b) is an isocyanate group.

7. The process according to claim 1, wherein the functional group contained in the olefin polymer (a) is an isocyanate group and the functional group contained in the radical-polymerizable monomer (b) is a hydroxyl group.

8. The process according to claim 1, wherein the monomer (c) comprises as an essential component methyl acrylate and/or methyl methacrylate.

9. The process according to claim 1, wherein the polymerization product A contains from 30 to 70 wt. % of the monomer (c).

* * * * *